United States Patent
Kim et al.

(10) Patent No.: US 9,853,953 B2
(45) Date of Patent: Dec. 26, 2017

(54) METHOD OF TRANSFERRING RIGHTS OBJECT AND ELECTRONIC DEVICE

(71) Applicant: SAMSUNG ELECTRONICS CO., LTD., Gyeonggi-do (KR)

(72) Inventors: Yeo-Jin Kim, Suwon-si (KR); Yun-Sang Oh, Seoul (KR); Sang-Gyoo Sim, Suwon-si (KR); Kyung-im Jung, Seongnam-si (KR); Ji-Soo Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/067,662

(22) Filed: Mar. 11, 2016

(65) Prior Publication Data

US 2016/0197891 A1    Jul. 7, 2016

Related U.S. Application Data

(62) Division of application No. 11/745,816, filed on May 8, 2007.

(60) Provisional application No. 60/799,652, filed on May 12, 2006.

(30) Foreign Application Priority Data

Apr. 2, 2007 (KR) .......... 10-2007-0032497

(51) Int. Cl.
| | |
|---|---|
| H04L 29/06 | (2006.01) |
| G06F 21/10 | (2013.01) |
| H04L 9/08 | (2006.01) |

(52) U.S. Cl.
CPC .......... *H04L 63/0428* (2013.01); *G06F 21/10* (2013.01); *H04L 9/0816* (2013.01); *H04L 2209/24* (2013.01); *H04L 2209/603* (2013.01)

(58) Field of Classification Search
CPC ................................................. H04L 63/0428
See application file for complete search history.

(56) References Cited

U.S. PATENT DOCUMENTS

| 5,390,297 | A | 2/1995 | Barber et al. |
| 5,982,891 | A | 11/1999 | Ginter et al. |
| 7,181,629 | B1 * | 2/2007 | Hatanaka ................ G06F 21/10 |
| | | | 713/189 |
| 2002/0026424 | A1 | 2/2002 | Akashi |
| 2002/0029199 | A1 | 3/2002 | Go et al. |

(Continued)

FOREIGN PATENT DOCUMENTS

| EP | 1 045 388 A1 | 10/2000 |
| EP | 1 416 406 A1 | 5/2004 |

(Continued)

OTHER PUBLICATIONS

Muller, "Desktop Encyclopedia of the Internet", 1999, Artech House Inc., Norwood, MA, all pages.

(Continued)

*Primary Examiner* — Jacob C. Coppola
(74) *Attorney, Agent, or Firm* — Sughrue Mion, PLLC

(57) ABSTRACT

A method of transferring a rights object (RO) and an electronic device are provided. The method includes generating a secure RO by encrypting an RO including usage rights information regarding digital content and transferring the secure RO from a first device to a second device.

5 Claims, 4 Drawing Sheets

(56) References Cited

U.S. PATENT DOCUMENTS

| | | |
|---|---|---|
| 2002/0029347 A1 | 3/2002 | Edelman |
| 2003/0076955 A1 | 4/2003 | Alve et al. |
| 2003/0174838 A1 | 9/2003 | Bremer |
| 2004/0158741 A1 | 8/2004 | Schneider |
| 2004/0168077 A1 | 8/2004 | Waxman et al. |
| 2005/0022025 A1 | 1/2005 | Hug |
| 2005/0065891 A1 | 3/2005 | Lee et al. |
| 2005/0172127 A1 | 8/2005 | Hartung et al. |
| 2005/0209972 A1 | 9/2005 | Bjorkengren et al. |
| 2005/0210249 A1* | 9/2005 | Lee .............. G06F 21/10 713/168 |
| 2005/0216419 A1 | 9/2005 | Lee et al. |
| 2005/0216763 A1 | 9/2005 | Lee et al. |
| 2006/0059105 A1* | 3/2006 | Ebihara .......... G06F 21/10 705/59 |
| 2006/0155650 A1* | 7/2006 | Oh .............. G06F 21/10 705/57 |
| 2006/0155651 A1* | 7/2006 | Oh .............. G06F 21/10 705/57 |
| 2006/0156413 A1* | 7/2006 | Oh .......... G11B 20/00086 726/26 |
| 2006/0190740 A1* | 8/2006 | Hori ............ G06F 21/10 713/189 |
| 2006/0257102 A1* | 11/2006 | Park .......... G11B 20/00173 386/259 |
| 2007/0266441 A1 | 11/2007 | Kim et al. |

FOREIGN PATENT DOCUMENTS

| | | | |
|---|---|---|---|
| JP | 2005063068 A | 3/2005 | |
| KR | 1020050094317 A | 9/2005 | |
| KR | WO-2005091163 A1 * | 9/2005 | ............ G06F 21/10 |
| KR | 1020050101940 A | 10/2005 | |
| KR | WO 2005093597 A1 * | 10/2005 | ............ G06F 21/10 |
| WO | 2005/093597 A1 | 10/2005 | |

OTHER PUBLICATIONS

White, "How Computers Work", Millennium Editions, 1999, Que Corporation, Indianapolis, IN, all pages.
Derfler, "How Networks Work", Bestseller Edition, 1996, Ziff-Davis Press, Emeryville, CA, all pages.
Gralla, "How the Internet Works", Millennium Edition, 1999, Que Corporation, Indianapolis, IN, all pages.
Office Action dated Jul. 5, 2011 from the Japanese Patent Office in counterpart Japanese application No. 2009-509434.
Communication dated Aug. 18, 2016 issued by the European Patent Office in counterpart European Application No. 07746457.6.

* cited by examiner

METHOD OF TRANSFERRING RIGHTS OBJECT AND ELECTRONIC DEVICE

This is a Divisional of U.S. application Ser. No. 11/745,816, filed May 8, 2007, which claims priority from Korean Patent Application No. 10-2007-32497 filed on Apr. 2, 2007 in the Korean Intellectual Property Office, and U.S. Provisional Patent Application No. 60/799,652 filed on May 12, 2006 in the United States Patent and Trademark Office, the disclosures of which are incorporated herein by reference in their entirety.

BACKGROUND OF THE INVENTION

1. Field of the Invention

Methods consistent with the present invention relate to transferring a rights object (RO) and an electronic device, and more particularly, to transferring an RO and an electronic device which can prevent an RO from being copied during the transfer of the RO.

2. Description of the Related Art

In recent years, research has been vigorously conducted on Digital Rights Management (DRM), which is a technology for protecting digital content that can be easily copied and distributed, and various services adopting DRM technology have been or are currently being commercialized.

Related art techniques of protecting digital content generally focus on the prevention of illegitimate access to digital content. For example, in the related art, only users who have paid charges for digital content are allowed to access the digital content, whereas users who have not paid any charges for the digital content are not allowed to access the digital content.

Due to the characteristics of digital data, digital content can be easily reused, processed, copied, and distributed. Therefore, if digital content is illegitimately copied or distributed by users who have access to the digital content, the digital content can be used even by users who have not paid any charges for the digital content and are thus not eligible for the digital content.

In order to address this, DRM technology requires encryption of digital content for safe distribution of digital content and also requires a predetermined license, called a Rights Object (RO), for the use of digital content.

Referring to FIG. 1, a user who wishes to use digital content may be provided with desired digital content by a content provider 120 with a host device 110. The digital content provided by the content provider 120 is encrypted. In order to use encrypted digital content (hereinafter referred to as a content item), an RO is necessary.

The user may purchase an RO including the right to execute a content item from an RO issuer 130 using the host device 110. The right to execute the content item may be a content encryption key that is necessary to decrypt the content item.

The RO issuer 130 may report a statement regarding the issuance of ROs to the content provider 120. The RO issuer 130 may be the same entity as the content provider 120.

A user can use a content item by acquiring an RO corresponding to the content item.

A content item can be freely copied to or distributed to a number of users without an RO. An RO includes usage restriction information regarding the number of times that a content item can be used, a period of time for which the content item can be used, and/or the number of times that the RO can be copied, and thus imposes restrictions on the reuse or copy of content.

In short, it is possible to effectively protect digital content using DRM technology A user may store an RO in a host device such as a mobile phone or a personal digital assistant (PDA) which can execute multimedia data.

In order to facilitate the maintenance and distribution of content items and ROs, methods of storing ROs in portable storage devices such as memory sticks or multimedia cards (MMCs) have been developed.

FIG. 2 illustrates a flowchart of a related art method of transferring an RO present in a host device 110 to a portable storage device 140. When the portable storage device 140 is connected to the host device 110, a user can execute an RO transfer command for transferring an RO from the host device 110 to the portable storage device 140.

Referring to FIG. 2, in operation S110, the host device 110 transfers an RO to the portable storage device 140 upon execution of an RO transfer command. In operation S120, when the transfer of the RO is complete, the portable storage device 140 notifies the host device 110 of the completion of the RO transfer. In operation S130, the host device 110 removes the RO present therein upon being notified that the transfer of the RO has been completed.

If the method is terminated abnormally at a time A between operation S110 and operation S120, the host device 110 cannot be notified of whether the transfer of the RO has been completed and thus may not be able to decide when to remove the RO present therein. As a result, the RO remains in both the host device 110 and the portable storage device 140. That is, the RO is copied during the transfer of the RO.

SUMMARY OF THE INVENTION

The present invention provides a method of transferring an RO and an electronic device which can prevent an RO from being copied during the transfer of the RO.

According to an aspect of the present invention, there is provided a method of transferring a RO including usage rights information regarding digital content, the method including generating a secure RO by encrypting the RO and transferring the secure RO from a first device to a second device.

According to another aspect of the present invention, there is provided an electronic device, including a storage module which stores an RO including usage rights information regarding digital content, an encryption module which generates a secure RO by encrypting the RO, an interface module which enables the electronic device to interface with an external device, and a control module which controls the encryption module to generate the secure RO and transfers the secure RO to the external device via the interface module.

According to another aspect of the present invention, there is provided an electronic device, including an interface module which enables the electronic device to interface with an external device that transmits an encrypted RO, a storage module which stores the encrypted RO, a decryption module which decrypts the encrypted RO, and a control module which controls the decryption module to decrypt the encrypted RO and stores a decrypted RO obtained by the decryption performed by the decryption module in the storage module.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
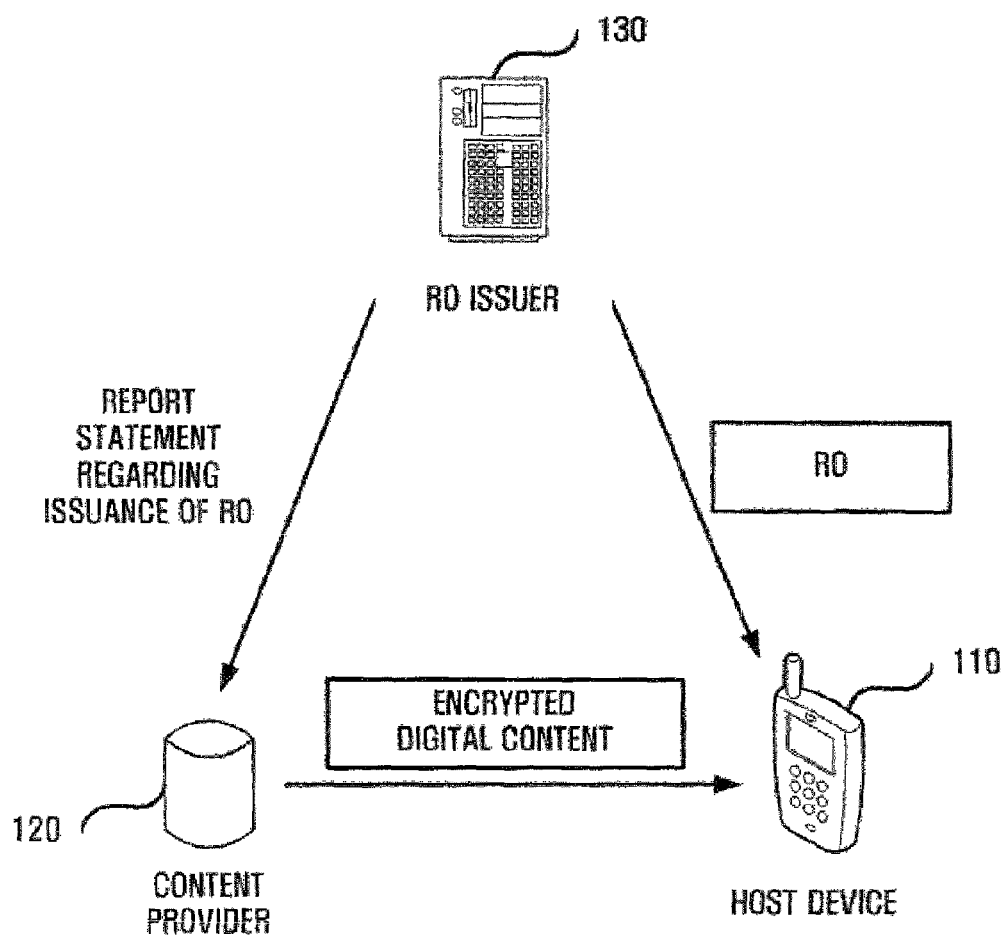
FIG. 1 illustrates a block diagram of a related art digital rights management system.
Figure 2:
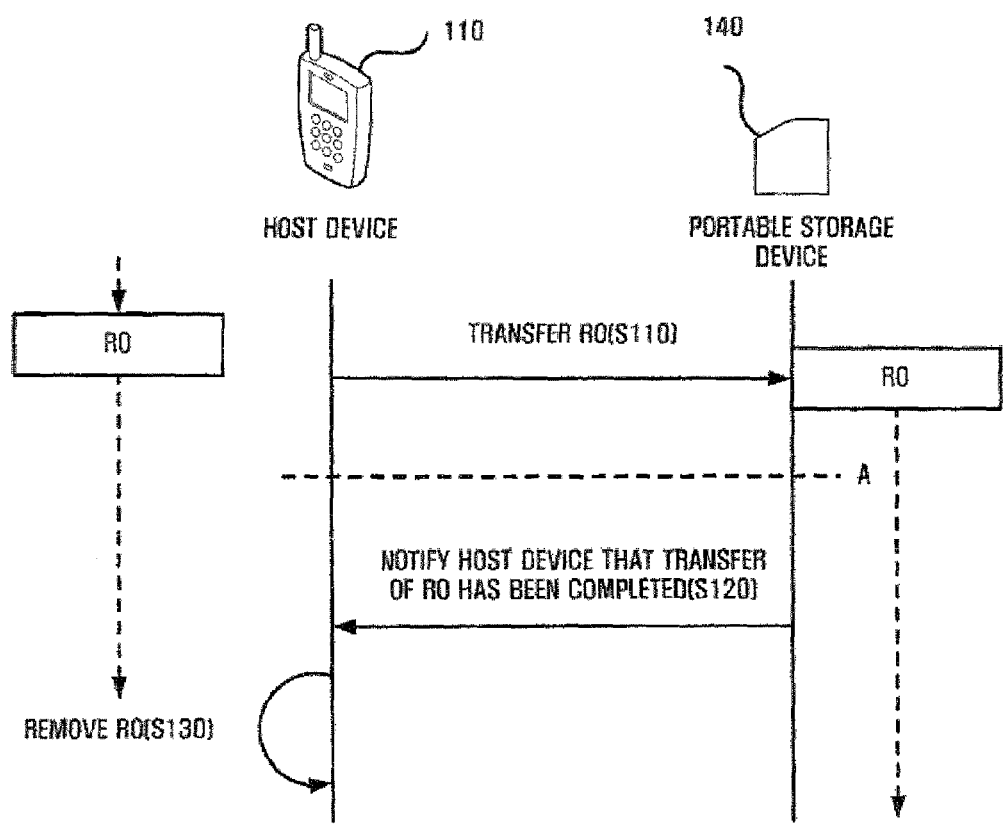
FIG. 2 illustrates a flowchart of a related art method of transferring a rights object (RO)

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements, and thus their description will be omitted.

For a better understanding of the present invention, the definitions of the terms frequently used in this disclosure will be given below.

The term 'transfer' denotes a process of moving a file from one device to another. During the transfer of a file, the file may exist in two devices at the same time. However, once the transfer of a file from a first device to a second device is completed, the file must not exist in the first device any longer, but must exist only in the second device.

The term 'copy' denotes a process of duplicating a Rights Object (RO) so that the RO can become available in two or more devices.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatuses provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 3:
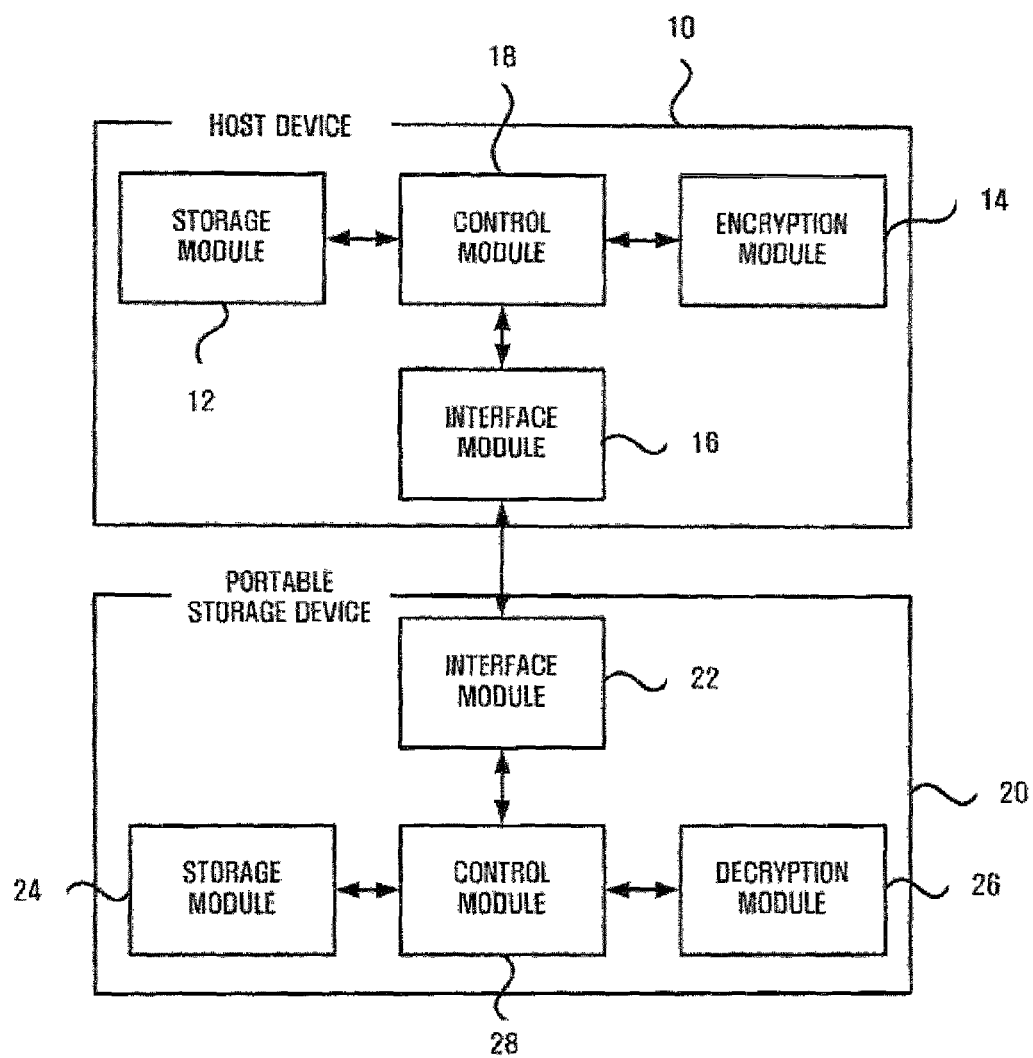
FIG. 3 illustrates a block diagram of a system for transferring an RO according to an exemplary embodiment of the present invention.

FIG. 3 illustrates a block diagram of a system for transferring an RO according to an exemplary embodiment of the present invention. Referring to FIG. 3, the system includes a host device 10 in which an RO is stored and a portable storage device 20 which can be connected to the host device 10.

The host device 10 reproduces and manages digital content according to the rights defined in the RO present in the host device 10. The host device 10 may be a multimedia device such as a mobile phone, a personal digital assistant (PDA), a laptop computer, a desktop computer, or a digital television.

The portable storage device 20 includes a nonvolatile memory such as a flash memory which can read, write, and erase data. The portable storage device 20 has data processing capabilities and can be easily connected to or detached from the host device 10. The portable storage device 20 may be a Smart Media (SM) card, a memory stick, a Compact Flash (CF) card, an eXtreme Digital (XD) card, or a multimedia card.

The host device 10 includes a storage module 12 which stores an RO, an encryption module 14 which encrypts an RO, an interface module 16 which enables the host device 10 to interface with the portable storage device 20, and a control module 18 which controls the storage module 12, the encryption module 14, and the interface module 16.

The RO present in the storage module 12 is a type of license including rights information regarding the right to use a content item, use restriction information regarding restrictions imposed on the use of the content item, copy restriction information regarding restrictions imposed on the copy of an RO, an identifier of the RO, and an identifier of the content item.

The rights information regarding the right to use a content item may be a content encryption key (CEK) which is necessary to decode a content item.

The encryption module 14 encrypts the RO present in the storage module 12 upon the request of the control module 18 and generates an encrypted RO.

More specifically, the encryption module 14 extracts a CEK from an RO, and encrypts the RO by encrypting the CEK using an encryption key. However, the present invention is not restricted to this. The encryption module 14 may extract one or more pieces of information, other than the CEK, from an RO and encrypt the extracted pieces of information. Once an RO is encrypted, content corresponding to the RO cannot be used until the RO is decrypted. Hereinafter, the RO having some specific fields encrypted by the encryption key, which only host device knows, is referred to as the secure RO.

The interface module 16 enables the host device 10 to interface with the portable storage device 20. The host device 10 transmits data to or receives data from the portable storage device 20 through the interface 16. When the host device 10 is connected to the portable storage device 20, the interface module 16 of the host device 10 may be electrically connected to an interface module 22 of the portable storage device 20. However, the present invention is not restricted to this. That is, when the host device 10 is connected to the portable storage device 20, the interface module 16 of the host device 10 may not necessarily be directly connected to the interface module 22 of the portable storage device 20, and may communicate with the interface module 22 of the portable storage device 20 with the aid of a wireless medium. In addition, the interface module 16 of the host device 10 and the interface module 22 of the portable storage device 20 may conduct mutual authentication and secure communication apart from processing the secure RO. The secure communication means that the transferred data, including the secure RO, are encrypted by the session key generated during the mutual authentication step.

When an RO transfer command is received from a user, the control module 18 controls the encryption module 14 to encrypt the RO present in the storage module 12 and stores a secure RO obtained by the encryption performed by the encryption module 14 in the storage module 12. Thereafter, the control module 18 transfers the secure RO to the portable storage device 20 via the interface module 16. The RO transfer command may be received from the user by an input module (not shown). Alternatively, the control module 18 may transfer the RO present in the storage module 12 to the portable storage device 20 upon connecting the portable storage device 20 to the host device 10.

When the portable storage device 20 notifies the control module 18, via the interface module 16, that the transfer of the secure RO has been complete, the control module 18 removes the secure RO present in the storage module 12.

Thereafter, the control module 18 issues a request for decryption of the secure RO to the portable storage device 20 via the interface module 16. In this case, the control module 18 transmits the encryption key used to produce the secure RO to the portable storage device 20.

The portable storage device 20 includes the interface module 22, a storage module 24, a decryption module 26, and a control module 28.

The interface module 22 enables the portable storage device 20 to interface with the host device 10. The portable storage device 20 transmits data to or receives data from the host device 10 via the interface module 22.

The storage module 24 stores a secure RO received by the interface module 22. A secure RO may have an identification module (not shown) by which the secure RO can be distinguished from an RO yet to be encrypted. Alternatively, an identification module capable of distinguishing a secure RO from an RO yet to be encrypted may be provided as an independent module.

The decryption module 26 decrypts the secure RO present in the storage module 24 upon the request of the control module 28. In detail, the decryption module 26 decrypts the secure RO present in the storage module 24 using the encryption key received from the host device 10 via the interface module 22.

The control module 28 identifies a secure RO received by the interface module 22 and stores the secure RO in the storage module 24. When a request for decryption of the secure RO is issued by the host device 10, the control module 28 controls the decryption module 26 to decrypt the secure RO and stores a decrypted secure RO obtained by the decryption module 26 in the storage module 24. Also, the control module 28 notifies the host device 10, via the interface module 22, that the decryption of the secure RO has been completed.

Figure 4:
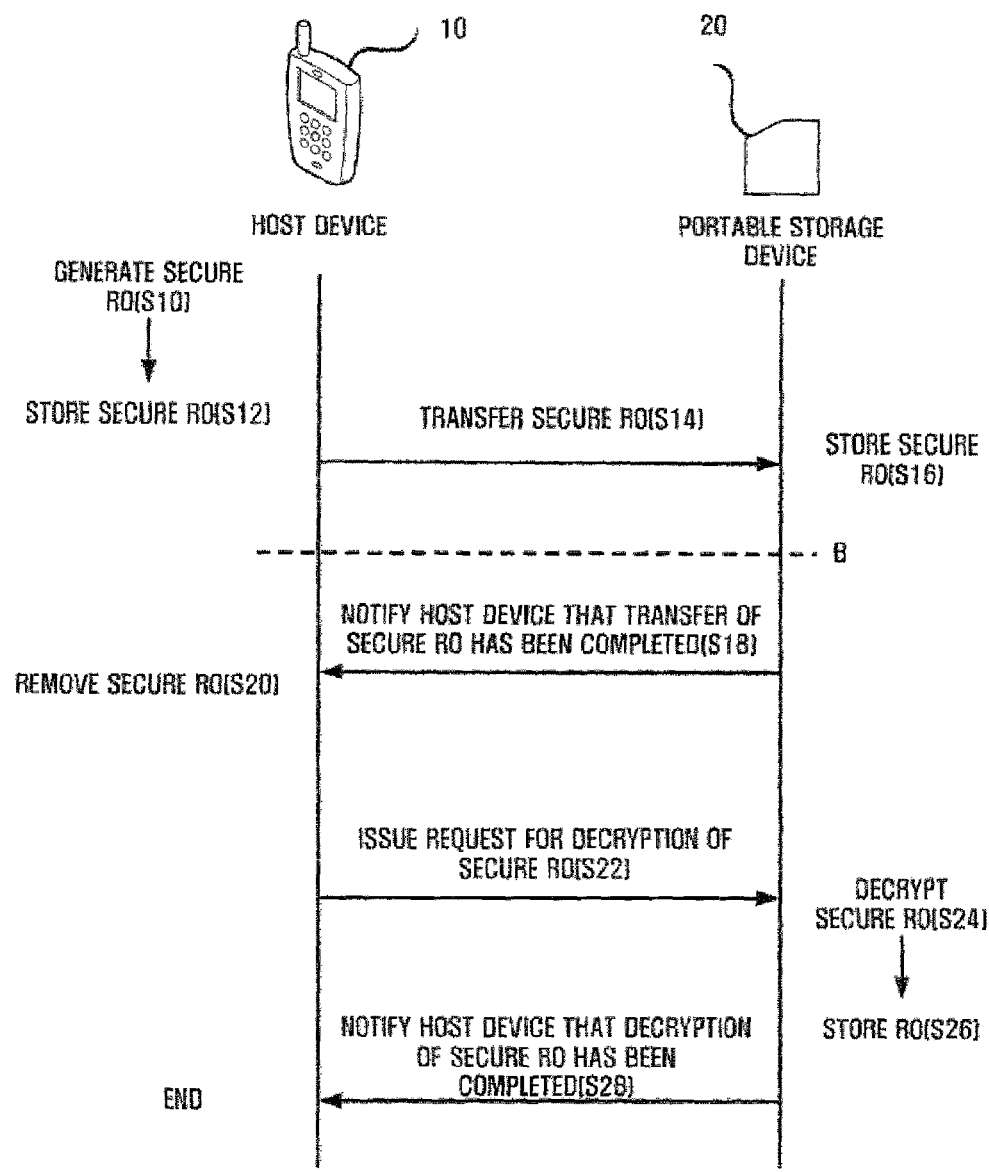
FIG. 4 illustrates a flowchart of a method of transferring an RO according to an exemplary embodiment of the present invention.

FIG. 4 illustrates a flowchart of a method of transferring an RO according to an exemplary embodiment of the present invention. Referring to FIG. 4, in operation S10, when an RO transfer command is received from a user, the encryption module 14 of the host device 10 generates a secure RO by extracting a CEK of an RO present in the storage module 12 and encrypting the CEK with a encryption key under the control of the control module 18. In operation S12, the control module 18 stores the secure RO in the storage module 12. The RO stored in the host device 10 needs to be prevented from being used by the host device 10 before successfully transferring the RO to the portable storage device 20 because it is not desirable that the state information of the transferred secure RO differs from the state information of the RO stored in the host device 10. That is, the host device 10 stores the secure RO instead of the existing RO to maintain the consistency of two ROs stored in the host device 10 and the portable storage device 20. But, the control module 18 may not store the secure RO in the storage module 12. If the state information of the transferred secure RO differs from the state information of the RO stored in the host device 10, the transferred secure RO may be removed, and the transfer process may restart. In operation S14, the control module 18 transmits the secure RO to the portable storage device 20 via the interface module 16.

In operation S16, the control module 28 of the portable storage device 20 receives the secure RO transmitted by the control module 18 of the host device 10 via the interface module 22 and stores the secure RO in the storage module 24. In operation S18, the control module 28 notifies the host device 10, via the interface module 22, that the transfer of the secure RO has been completed.

In operation S20, the control module 18 of the host device 10 removes the secure RO present in the storage module 12 upon being notified that the transfer of the secure RO has been completed.

In operation S22, the control module 18 issues a request for decryption of the secure RO to the portable storage device 20 via the interface module 16. In this case, the control module 18 transmits the encryption key used to produce the secure RO to the portable storage device 20.

In operation S24, the control module 28 of the portable storage device 20 controls the decryption module 26 to decrypt the secure RO using the encryption key transmitted by the control module 18 of the host device 10. In operation S26, the control module 28 stores a decrypted RO obtained by the decryption performed by the decryption module 26 in the storage module 24. In operation S28, the control module 28 notifies the host device 10, via the interface module 22, that the decryption of the secure RO has been completed.

Even if the method is terminated abnormally at a time B between operation S16 and operation S18, an RO present in the host device 10 and the portable storage device 20, respectively, cannot be used because the RO is still encrypted. Therefore, it is possible to prevent an RO from being copied.

If the host device 10 does not remove the secure RO present in the storage module 12 in operation S20, the secure RO can be used later by decrypting the secure RO. However, the secure RO present in the portable storage device 20 can be transferred to but not used by other devices. In order to use the secure RO present in the portable storage device 20, the user must perform the above-described method of transferring an RO.

In the above-described exemplary embodiments, a CEK of an RO is encrypted before the transfer of the RO so that the RO cannot be used unless decrypted. Therefore, even if an RO exists in two devices at the same time, the copy of the RO can be prevented, and the use of the RO can be allowed only when the transfer of the RO is properly completed. In the above-described exemplary embodiments, an RO present in the host device 10 is encrypted, and the encrypted RO is transferred to the portable storage device 20. However, the present invention is not restricted to this and the present invention may be applied to the transfer of an RO from a portable storage device to a host device, from one host device to another host device, and from one portable storage device to another portable storage device.

As described above, according to the present invention, it is possible to prevent an RO from being copied during the transfer of the RO.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electronic device comprising:
   a memory storing computer-readable instructions for causing the electronic device to implement a method of transferring a secure rights object (RO) between the electronic device and an external device; and
   a processor which when executing the computer-readable instructions is configured to control the electronic device to implement the method of transferring the secure RO between the electronic device and the external device, the method comprising:
   interfacing, by the electronic device, with the external device that transmits a copy of the secure RO;
   receiving, by the electronic device, the copy of the secure RO from the external device in a first transmission from the external device;
   notifying, by the electronic device, the external device that the receiving of the copy of the secure RO has been completed, wherein the external device removes the secure RO from a memory within the external device in response to the notifying;
   receiving, by the electronic device, a request for decryption of the copy of the secure RO from the external device in a second transmission separate from the first transmission, wherein the request for decryption includes an encryption key used by the external device to generate the secure RO;
   in response to the request for decryption of the secure RO, decrypting, by the electronic device, the secure RO using the encryption key; and
   notifying the external device that the decrypting of the secure RO has been completed.

2. The electronic device of claim 1, wherein the processor when executing the computer-readable instructions is further configured to store the secure RO received from the external device in the memory.

3. The electronic device of claim 2, wherein the secure RO has an identification module by which the secure RO to be distinguished from a RO which is not encrypted.

4. The electronic device of claim 2, wherein the processor when executing the computer-readable instructions is further configured to distinguish the secure RO from a RO which is not encrypted.

5. A method of transferring a secure rights object (RO) between an electronic device and an external device, the method comprising:
   interfacing, by the electronic device, with the external device that transmits a copy of the secure RO;
   receiving, by the electronic device, the copy of the secure RO from the external device in a first transmission from the external device;
   notifying, by the electronic device, the external device that the receiving of the copy of the secure RO has been completed, wherein the external device removes the secure RO from a memory within the external device in response to the notifying;
   receiving, by the electronic device, a request for decryption of the copy of the secure RO from the external device in a second transmission separate from the first transmission, wherein the request for decryption includes an encryption key used by the external device to generate the secure RO;
   in response to the request for decryption of the secure RO, decrypting, by the electronic device, the secure RO using the encryption key; and
   notifying the external device that the decrypting of the secure RO has been completed.

* * * * *